Feb. 1, 1944. G. O. JOHNSON 2,340,475
JOINT CONSTRUCTION
Filed Oct. 27, 1941
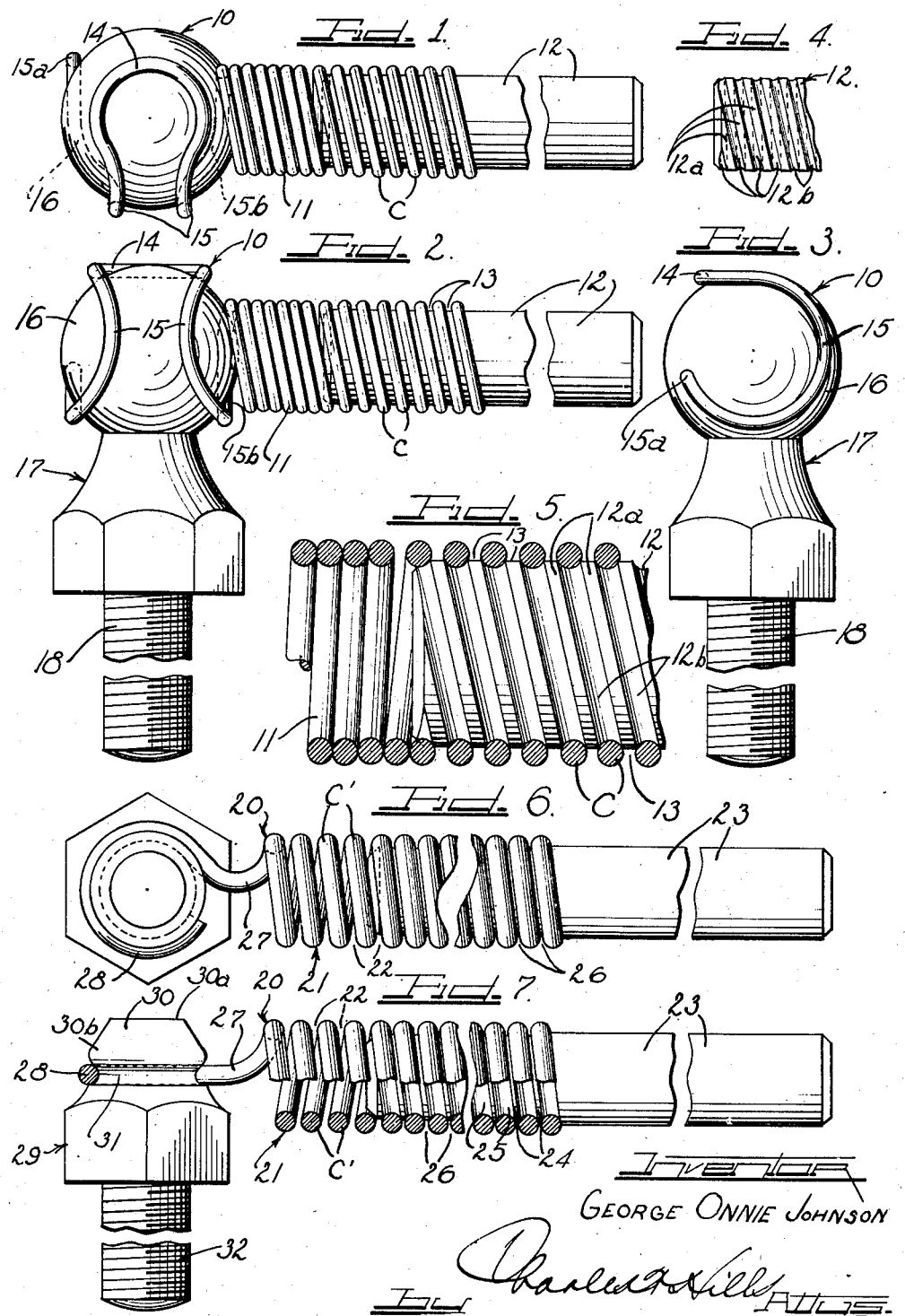
Inventor
GEORGE ONNIE JOHNSON Patented Feb. 1, 1944

2,340,475

UNITED STATES PATENT OFFICE 2,340,475

JOINT CONSTRUCTION

George Onnie Johnson, Detroit, Mich., assignor to Thompson Products Incorporated, Cleveland, Ohio, a corporation of Ohio Application October 27, 1941, Serial No. 416,659

8 Claims. (Cl. 287—90)

This invention relates to joint constructions wherein the socket member is composed of a coil spring.

More particularly the invention relates to throttle rod connections, aircraft control connections, and the like, embodying a coil spring adapted to be threaded onto a rod and having a projecting end providing a socket for a stud.

In accordance with this invention a tubular coil spring is threaded onto a rod or shank member having threads extending inwardly from the end thereof with a greater or lesser pitch than the coils of the spring so that the coils are axially stressed on the rod or shank member. The resulting spreading apart or squeezing together of the coils fixedly holds the spring on the rod or shank since the spring is stressed and frictionally grips the threads thereby resisting rotation. The coil spring has an end portion projecting from the rod or shank. One or more of the coils of this projecting portion is deformed so as to provide either a ball seat for a ball stud, or an eye for snapping into the groove of a grooved stud.

The ball socket can be conveniently formed by separating two adjacent coils of the spring so as to provide a loop over the free end of the ball and legs extending from the loop to straddle both sides of the ball. The shank of the ball stud can project freely between these legs.

In the form of the joint having an eye end, one or more of the projecting coils of the spring are deformed to provide a loop or eye of the proper size. A stud having a grooved head can then be conveniently snapped into the eye since the eye is resiliently expansible.

The joints or connections of this invention are inexpensive, easy to make, and accommodate universal movement between the parts.

It is, then, an object of this invention to provide joint constructions having coil spring sockets.

Another object of the invention is to fixedly retain a coil spring on a threaded member by adjusting the pitch of the threads to axially stress the coils of the spring as the spring is threaded on the member.

A further object of this invention is to provide a ball and socket joint construction wherein the socket member is formed from spread coils of a coil spring.

A further object of this invention is to provide a swivel joint having an expansible eye end formed from a coil spring together with a coil spring hollow shank portion projecting from said eye end.

Other and further objects of the invention will be apparent to those skilled in the art from the following detailed description of the annexed sheet of drawings which, by way of preferred examples, illustrate two modifications of the invention.

On the drawing:

Figure 1 is a broken plan view of a coil spring type ball and socket joint according to this invention.

Figure 2 is a broken side elevational view of the joint shown in Figure 1.

Figure 3 is a broken end elevational view of the joint shown in Figures 1 and 2.

Figure 4 is a fragmentary side elevational view of the threaded end of a rod adapted for receiving the coil spring joint socket shown in Figures 1 to 3.

Figure 5 is an enlarged fragmentary vertical cross-sectional view, with parts in side elevation, illustrating the manner in which the coils of the spring are spread apart as they are threaded onto the rod.

Figure 6 is a broken plan view of a modified form of joint construction according to this invention.

Figure 7 is a broken side elevational view, with parts in vertical cross section, of the modified joint construction shown in Figure 6.

As shown on the drawing:

In Figures 1 to 3 inclusive the reference numeral 10 designates generally a ball and socket joint construction according to this invention having a tubular coil spring socket 11 with one end having a plurality of coils C thereof threaded onto a rod or shank 12. The shank 12, as best shown in Figure 4, has threads 12a spaced apart a greater distance than the normal spacing of the coils C so as to provide coil-receiving grooves 12b therebetween in spaced relation. It will be understood, of course, that the grooves 12b are continuous or helical but as the coils C are threaded onto the rod 12 the same will be spread apart by the threads 12a to provide spaces 13 therebetween. The spring socket 11 thus has a plurality of the coils C thereof spread apart to elongate the spring, and these coils are thus placed under tension and tend to reclaim their original spacing. As a result, each of the spread coils C will frictionally grip the threads 12a of the rod 12 and will resist relative rotation between the socket and rod.

The coil spring socket 11 projects for a plurality of coils from the end of the rod 12 as best shown in Figures 1 and 2 and has the two end coils spread apart to provide a loop 14 and outwardly curved legs 15 extending therefrom in spaced relation. One leg 15 has a free end 15a as best shown in Figure 3 which is circularly bent back under the loop 14. The other leg 15 has a portion 15b bent back under the loop 14 which merges with the first undeformed coil of the spring.

As a result a ball socket is provided by the spread coils and the ball end 16 of a ball stud 17 is adapted to be snapped into the socket defined by the spread coils. The stud 17 has a threaded shank portion 18 adapted for insertion in any type of mounting. The ball end 16 thereof can readily be snapped between the legs 15 and the loop 14 will retain the free end of the ball. The legs 15 thus straddle the sides of the ball and the leg ends 15a and 15b provide additional ball retaining means. The shank portion of the stud can project freely between the legs 15.

Connections between operating members such as between a throttle rod and a crank arm can be readily made by joints of this invention by merely threading the coil spring socket 11 onto the throttle rod and by snapping a ball stud 17 carried by the crank arm into the ball socket provided by the spread coils of the spring.

In the modification shown in Figures 6 and 7, a tubular coil spring 21 has coils C' normally separated to provide spaces 22 therebetween. A rod 23 has a threaded end provided with threads 24 having a lesser pitch than the pitch of the coils C' so as to provide grooves 25 between the threads which are spaced closer together than the free spacing of the coils. Thus when the spring is threaded onto the rod 23 the coils C' are compressed into closer relation and smaller spaces 26 are provided between the coils. This compression of the coils produces the same effect as the stressing of the coils described above in connection with Figures 1 to 5, namely, to resist rotation of the coil spring relative to the rod.

The coil spring 21 projects freely from the end of the rod 23 for several coils and is deformed at the end thereof to provide a laterally extending leg 27 which has the end portion thereof bent into a loop or eye 28. The projecting coils allow tilting of the leg 27 in all planes.

A stud member 29 has a head 30 with a reduced free end portion 30a adapted to fit into the eye 28. The head tapers outwardly to a larger diameter 30b which is greater than the normal inner diameter of the eye 28. A groove 31 is formed in the head 30 just below the large diameter 30b thereof so that insertion of the head 30 will expand the eye 28 to clear the large diameter 30b thereof and the eye will then snap into the groove 31 for rotatably retaining the stud. The stud can thus rotate in the eye and can tilt in all planes through deflection of the projecting coils. The stud has a threaded shank portion 32 adapted for connection with any type of mounting means such as a crank arm.

From the above description it will be understood that this invention provides inexpensive joint or universal type connections for links wherein a coil spring is utilized as the female or socket member of the joint and wherein the coils of the spring are deformed to provide a socket and are either stressed or compressed to engage a threaded member and resist relative rotation between the coils and threaded member.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint construction comprising a coiled spring member having deformed adjacent coils spread apart and shaped to define a ball stud receiving recess, and a ball stud having the ball end thereof snapped into said recess.

2. A link construction comprising a rod having a threaded end portion, a tubular helically coiled spring having coils at a different pitch than the pitch of said threaded end portion in threaded engagement with the threaded end portion whereby said coils are deformed into stressed position for gripping the threads of the rod, said coil spring having an integral end beyond said coils defining a stud socket with a resiliently expansible and contractible opening, and a stud having a head snapping through said opening into said socket.

3. A connector for joining the threaded end of a rod with a stud which comprises a tubular coil spring having the coils thereof at a different pitch than the threads of the rod to be stressed by the rod threads into gripping engagement therewith and having certain of the coils thereof deformed to provide a socket recess for the stud, said recess having a resiliently expansible and contractible opening lying in a plane parallel with the axis of the coil spring.

4. A ball and socket joint construction comprising a coil spring tubular shank portion and a ball socket end portion composed of spread coils deformed to provide a loop with curved legs for straddling opposite sides of the ball end of a stud.

5. A link construction comprising a tubular coil spring, a rod having a threaded end of a greater pitch than the coils of the spring threaded into a portion of said tubular spring whereby the coils surrounding the rod are axially stretched by said thread to resist rotational movement between the rod and spring, and said spring having deformed coils projecting from said rod defining a socket recess.

6. A link construction comprising a tubular coil spring, a rod having a threaded end portion with a pitch lesser than the pitch of the coil threaded into several of the coils to compress the coils together and resist relative rotation between the coil spring and rod, and said coil spring having a deformed end portion defining a socket recess.

7. A throttle rod connector comprising a tubular coil spring having closely adjacent coils, a throttle rod having a threaded end with a pitch greater than the coils of the spring threaded into said coil spring to axially stretch the coils apart, said coil spring having an end portion projecting from said throttle rod with deformed coils defining a socket recess, and a stud snapped into said recess.

8. A connector adapted for joining a threaded member with a headed stud which comprises a one-piece coiled wire spring having a tubular shank portion defined by a plurality of wire coils of the spring adapted to engage a threaded member in threaded relation and an integral wire socket portion on an end of said shank portion shaped to define a socket recess having a resiliently expansible and contractable opening giving entrance thereto beyond the shank portion whereby a headed member can be snapped through said opening into the socket portion for retention in said portion.

GEORGE ONNIE JOHNSON.